US012754450B1

(12) United States Patent
Dunn et al.

(10) Patent No.: US 12,754,450 B1
(45) Date of Patent: Oct. 6, 2026

(54) OPTICAL STACK WITH ADDITIONAL EDGE SEAL, ELECTRONIC DISPLAY INCORPORATING THE SAME, AND METHODS FOR PROVIDING THE SAME

(71) Applicant: Manufacturing Resources International, Inc., Alpharetta, GA (US)

(72) Inventors: William Dunn, Alpharetta, GA (US); Mike Brown, Cumming, GA (US); Tim Hubbard, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 19/011,020

(22) Filed: Jan. 6, 2025

Related U.S. Application Data

(60) Provisional application No. 63/622,692, filed on Jan. 19, 2024.

(51) Int. Cl.
*G02F 1/1339* (2006.01)
*G02F 1/13* (2006.01)

(52) U.S. Cl.
CPC .......... *G02F 1/1339* (2013.01); *G02F 1/1306* (2013.01)

(58) Field of Classification Search
CPC ..................................................... G02F 1/1339
See application file for complete search history.

(56) References Cited

U.S. PATENT DOCUMENTS

| | | | |
|---|---|---|---|
| 2,553,961 | A | 5/1951 | Dreyer |
| 2,907,102 | A | 10/1959 | Armstrong et al. |
| 2,986,379 | A | 5/1961 | Kramig, Jr. |
| 3,784,586 | A | 1/1974 | Thomas et al. |
| 3,823,794 | A | 7/1974 | Bre |
| 3,858,965 | A | 1/1975 | Sumita |
| 4,007,552 | A | 2/1977 | Brooks |
| 4,093,355 | A | 6/1978 | Kaplit et al. |
| 4,297,401 | A | 10/1981 | Chern et al. |
| 4,299,639 | A | 11/1981 | Bayer |
| 4,593,978 | A | 6/1986 | Mourey et al. |
| 4,604,444 | A | 8/1986 | Donnadieu et al. |
| 4,634,225 | A | 1/1987 | Haim et al. |
| 4,640,584 | A | 2/1987 | Tsuboyama et al. |

(Continued)

FOREIGN PATENT DOCUMENTS

| | | | |
|---|---|---|---|
| AU | 2003242399 | B2 | 11/2003 |
| CN | 102202860 | A | 9/2011 |

(Continued)

OTHER PUBLICATIONS

Dave Roos, How Transmissive Film Works, 2008, 9 Pages.

(Continued)

*Primary Examiner* — Edmond C Lau
(74) *Attorney, Agent, or Firm* — Standley Law Group LLP; Jeffrey S. Standley; Adam J. Smith

(57) ABSTRACT

An optical stack with additional edge seals, electronic displays incorporating the same, and methods for providing the same are disclosed. The optical stack includes a plurality of layers including an electronic display layer and a polarizer. A plurality of edge seals are provided for the plurality of layers. The edge seals may each include a deposit of adhesive, which may be spaced apart.

9 Claims, 15 Drawing Sheets

(56) References Cited

U.S. PATENT DOCUMENTS 4,691,995 A 9/1987 Yamazaki et al.
4,712,875 A 12/1987 Tsuboyama et al.
4,715,686 A 12/1987 Iwashita et al.
4,724,023 A 2/1988 Marriott
4,766,176 A 8/1988 Lee et al.
4,896,218 A 1/1990 Vick
4,950,344 A 8/1990 Glover et al.
5,029,982 A 7/1991 Nash
5,059,484 A 10/1991 Clark et al.
5,066,699 A 11/1991 Lee et al.
5,074,092 A 12/1991 Norlander
5,088,806 A 2/1992 McCartney et al.
5,148,591 A 9/1992 Pryor
5,330,262 A 7/1994 Peters
5,365,354 A 11/1994 Jannson et al.
5,379,139 A 1/1995 Sato et al.
5,402,141 A 3/1995 Haim et al.
5,406,399 A 4/1995 Koike
5,547,483 A 8/1996 Garcia et al.
5,548,038 A 8/1996 Enami et al.
5,559,614 A 9/1996 Urbish et al.
5,601,915 A 2/1997 Ochi et al.
5,606,438 A 2/1997 Margalit et al.
5,610,742 A 3/1997 Hinata et al.
5,656,824 A 8/1997 den Boer et al.
5,661,210 A 8/1997 Burns et al.
5,748,269 A 5/1998 Harris et al.
5,767,489 A 6/1998 Ferrier
5,818,010 A 10/1998 McCann
5,823,031 A 10/1998 Campbell et al.
5,838,405 A 11/1998 Izumi et al.
5,852,484 A 12/1998 Inoue et al.
5,869,919 A 2/1999 Sato et al.
5,899,027 A 5/1999 St. Louis
5,911,899 A 6/1999 Yoshikai et al.
5,937,611 A 8/1999 Howes
5,991,153 A 11/1999 Heady et al.
6,020,945 A 2/2000 Sawai et al.
6,074,741 A 6/2000 Murata et al.
6,089,751 A 7/2000 Conover et al.
6,099,672 A 8/2000 Yamazaki et al.
6,157,432 A 12/2000 Helbing
6,191,839 B1 2/2001 Briley et al.
6,198,515 B1 3/2001 Cole
6,211,934 B1 4/2001 Habing et al.
6,219,127 B1 4/2001 Hirakata et al.
6,357,763 B2 * 3/2002 Mathew ................ G02F 1/1339
349/190
6,359,390 B1 3/2002 Nagai
6,392,727 B1 5/2002 Larson et al.
6,398,371 B1 6/2002 Matsunaga et al.
6,417,900 B1 7/2002 Shin et al.
6,421,103 B2 7/2002 Yamaguchi
6,437,673 B1 8/2002 Nishida et al.
6,446,467 B1 9/2002 Lieberman et al.
6,451,870 B1 9/2002 DeCato et al.
6,465,092 B1 10/2002 Takushima et al.
6,472,032 B1 10/2002 Asano
6,504,713 B1 1/2003 Pandolfi et al.
6,512,562 B1 1/2003 Kobayashi et al.
6,535,266 B1 3/2003 Nemeth et al.
6,555,235 B1 4/2003 Aufderheide et al.
6,611,302 B1 8/2003 Ueda et al.
6,628,355 B1 9/2003 Takahara
6,650,393 B1 11/2003 Nishiguchi
6,683,639 B2 1/2004 Driessen-Olde Scheper et al.
6,692,986 B1 2/2004 Bayer et al.
6,727,468 B1 4/2004 Nemeth
6,731,357 B1 5/2004 Tachibana et al.
6,731,367 B1 5/2004 Saitoh
6,747,720 B2 6/2004 Saiki et al.
6,762,471 B2 7/2004 Kim
6,779,252 B2 8/2004 Tracy et al.
6,818,721 B2 11/2004 Zha et al.
6,825,899 B2 11/2004 Kobayashi
6,830,348 B2 12/2004 Nakamura et al.
6,839,104 B2 1/2005 Taniguchi et al.
6,873,387 B2 3/2005 Hokazono et al.
6,909,486 B2 6/2005 Wang et al.
6,943,768 B2 9/2005 Cavanaugh et al.
6,955,833 B1 10/2005 Gallego
7,052,152 B2 5/2006 Harbers et al.
7,059,757 B2 6/2006 Shimizu
7,083,285 B2 8/2006 Hsu et al.
7,131,313 B2 11/2006 Nakazato
7,161,642 B2 1/2007 Kim et al.
7,194,158 B2 3/2007 Schultheis et al.
7,218,812 B2 5/2007 Maxwell et al.
7,232,250 B2 6/2007 Chuang
7,295,179 B2 11/2007 Dunn
7,481,553 B2 1/2009 Kim et al.
7,481,566 B2 1/2009 Han
7,798,694 B2 9/2010 Hwang
7,811,640 B2 10/2010 Charters et al.
7,812,919 B2 10/2010 Chien et al.
7,922,381 B2 4/2011 Han et al.
8,004,648 B2 8/2011 Dunn
8,009,262 B2 8/2011 Dunn
8,120,595 B2 2/2012 Kukulj et al.
8,208,115 B2 6/2012 Dunn
8,242,974 B2 8/2012 Yamazaki et al.
8,269,916 B2 9/2012 Ohkawa
8,274,626 B2 9/2012 Choi et al.
8,294,168 B2 10/2012 Park et al.
8,529,993 B2 9/2013 Charters et al.
8,674,390 B2 3/2014 Harris et al.
8,674,963 B2 3/2014 Cornish et al.
8,711,321 B2 4/2014 Dunn et al.
8,827,472 B2 9/2014 Takada
8,879,042 B2 11/2014 Dunn
9,573,346 B2 2/2017 Dunn et al.
9,756,739 B2 9/2017 Russell-Clarke et al.
9,772,487 B1 * 9/2017 Jansen .................... B32B 17/00
11,668,695 B1 6/2023 Bolton
2001/0001459 A1 5/2001 Savant et al.
2001/0019454 A1 9/2001 Tadic-Galeb et al.
2001/0043293 A1 11/2001 Inoue
2002/0033919 A1 3/2002 Sanelle et al.
2002/0042162 A1 4/2002 Tone et al.
2002/0101553 A1 8/2002 Enomoto et al.
2002/0126248 A1 9/2002 Yoshida
2002/0149714 A1 10/2002 Anderson et al.
2002/0186333 A1 12/2002 Ha et al.
2002/0187575 A1 12/2002 Maruyama et al.
2003/0007109 A1 1/2003 Park
2003/0026085 A1 2/2003 Ueda et al.
2003/0090810 A1 5/2003 Detro et al.
2004/0018375 A1 1/2004 Banno et al.
2004/0032638 A1 2/2004 Tonar et al.
2004/0036834 A1 2/2004 Ohnishi et al.
2004/0062029 A1 4/2004 Ato
2004/0105159 A1 6/2004 Saccomanno et al.
2004/0113044 A1 6/2004 Ishiguchi
2004/0145805 A1 7/2004 Qiu
2004/0155997 A1 8/2004 West et al.
2004/0165139 A1 8/2004 Anderson et al.
2004/0239823 A1 12/2004 Silsby et al.
2005/0012722 A1 1/2005 Chon
2005/0062373 A1 3/2005 Kim et al.
2005/0073632 A1 4/2005 Dunn et al.
2005/0073640 A1 4/2005 Dunn et al.
2005/0099402 A1 * 5/2005 Nakanishi ........... G06F 3/04164
345/173
2005/0105178 A1 5/2005 Kim
2005/0115670 A1 6/2005 Bettinelli et al.
2005/0117110 A1 6/2005 Byun et al.
2005/0134526 A1 6/2005 Willem et al.
2005/0212990 A1 9/2005 Robinder
2005/0286131 A1 12/2005 Saxena et al.
2006/0082271 A1 4/2006 Lee et al.
2006/0082700 A1 4/2006 Gehlsen et al.
2006/0092348 A1 5/2006 Park
2006/0103299 A1 5/2006 Kwok et al.
2006/0132699 A1 6/2006 Cho et al.

(56) References Cited

U.S. PATENT DOCUMENTS

| | | | |
|---|---|---|---|
| 2006/0159867 | A1 | 7/2006 | O'Donnell |
| 2006/0209266 | A1 | 9/2006 | Utsunomiya |
| 2006/0262258 | A1 | 11/2006 | Wang et al. |
| 2006/0274237 | A1 | 12/2006 | Nelson et al. |
| 2006/0279946 | A1 | 12/2006 | Park et al. |
| 2006/0289201 | A1 | 12/2006 | Kim et al. |
| 2007/0065091 | A1 | 3/2007 | Hinata et al. |
| 2007/0103854 | A1 | 5/2007 | Yu et al. |
| 2007/0139574 | A1 | 6/2007 | Ko et al. |
| 2007/0151664 | A1 | 7/2007 | Shin |
| 2007/0200095 | A1 | 8/2007 | Murazaki |
| 2007/0206158 | A1 | 9/2007 | Kinoshita et al. |
| 2007/0230218 | A1 | 10/2007 | Jachim et al. |
| 2007/0267174 | A1 | 11/2007 | Kim |
| 2007/0268201 | A1 | 11/2007 | Sampsell et al. |
| 2007/0279556 | A1 | 12/2007 | Wang et al. |
| 2008/0049164 | A1 | 2/2008 | Jeon et al. |
| 2008/0083906 | A1 | 4/2008 | Takahara et al. |
| 2008/0111949 | A1 | 5/2008 | Shibata et al. |
| 2008/0111958 | A1 | 5/2008 | Kleverman et al. |
| 2008/0146709 | A1 | 6/2008 | Aketa et al. |
| 2008/0151082 | A1 | 6/2008 | Chan |
| 2008/0176345 | A1 | 7/2008 | Yu et al. |
| 2008/0230177 | A1 | 9/2008 | Crouser et al. |
| 2008/0261057 | A1 | 10/2008 | Slobodin |
| 2008/0284942 | A1 | 11/2008 | Mahama et al. |
| 2009/0015747 | A1 | 1/2009 | Nishizawa et al. |
| 2009/0015761 | A1 | 1/2009 | Stockham |
| 2009/0021915 | A1 | 1/2009 | Kuo |
| 2009/0088547 | A1 | 4/2009 | Schamschurin et al. |
| 2009/0104989 | A1 | 4/2009 | Williams et al. |
| 2009/0153780 | A1 | 6/2009 | Takata |
| 2009/0251650 | A1 | 10/2009 | Fukagawa et al. |
| 2010/0039696 | A1 | 2/2010 | de Groot et al. |
| 2010/0043966 | A1 | 2/2010 | Dunn et al. |
| 2010/0098839 | A1 | 4/2010 | Toyoda et al. |
| 2010/0253660 | A1 | 10/2010 | Hashimoto |
| 2010/0302777 | A1 | 12/2010 | Knoll et al. |
| 2010/0307800 | A1 | 12/2010 | Wee et al. |
| 2011/0019363 | A1 | 1/2011 | Vahlsing et al. |
| 2011/0090630 | A1 | 4/2011 | Bergeron et al. |
| 2011/0151197 | A1 | 6/2011 | Charters et al. |
| 2011/0194053 | A1 | 8/2011 | Tannas |
| 2011/0205472 | A1 | 8/2011 | Kobayashi et al. |
| 2011/0221995 | A1 | 9/2011 | Park |
| 2012/0050958 | A1 | 3/2012 | Sanford et al. |
| 2012/0069273 | A1 | 3/2012 | Watanabe |
| 2012/0111479 | A1 | 5/2012 | Sung et al. |
| 2012/0154712 | A1 | 6/2012 | Yu et al. |
| 2012/0242926 | A1 | 9/2012 | Hsu et al. |
| 2012/0275023 | A1 | 11/2012 | Weber et al. |
| 2012/0287368 | A1 | 11/2012 | Que et al. |
| 2012/0295051 | A1 | 11/2012 | Dunn et al. |
| 2013/0027633 | A1 | 1/2013 | Park et al. |
| 2013/0051200 | A1 | 2/2013 | Oshio |
| 2013/0094160 | A1 | 4/2013 | Narumi |
| 2013/0163277 | A1 | 6/2013 | Kim et al. |
| 2013/0206063 | A1 | 8/2013 | Van Rensburg et al. |
| 2013/0329363 | A1 | 12/2013 | Dunn et al. |
| 2014/0063432 | A1 * | 3/2014 | Yamazaki ............. G02F 1/1339 349/153 |
| 2014/0118221 | A1 | 5/2014 | Park et al. |
| 2014/0268657 | A1 | 9/2014 | Dunn et al. |
| 2014/0285732 | A1 | 9/2014 | Tanabe et al. |
| 2014/0321103 | A1 | 10/2014 | Dunn et al. |
| 2015/0177480 | A1 | 6/2015 | Bullock et al. |
| 2015/0328671 | A1 | 11/2015 | Ilinich et al. |
| 2016/0037657 | A1 | 2/2016 | Yoshizumi |
| 2017/0210668 | A1 | 7/2017 | Dunn et al. |
| 2017/0242290 | A1 | 8/2017 | Jenkins et al. |
| 2018/0086954 | A1 | 3/2018 | Morioka et al. |
| 2018/0366685 | A1 | 12/2018 | Park et al. |
| 2019/0377390 | A1 | 12/2019 | Wang et al. |
| 2020/0285099 | A1 | 9/2020 | Wang et al. |
| 2021/0046746 | A1 | 2/2021 | Xie |
| 2021/0191188 | A1 * | 6/2021 | Yu ..................... G02F 1/133514 |
| 2022/0161309 | A1 | 5/2022 | Gambino |
| 2022/0260872 | A1 | 8/2022 | Dunn et al. |
| 2023/0002558 | A1 | 1/2023 | Hedge et al. |

FOREIGN PATENT DOCUMENTS

| | | | |
|---|---|---|---|
| CN | 202815379 | U | 3/2013 |
| EP | 1640337 | A2 | 3/2006 |
| EP | 1923406 | A1 | 5/2008 |
| GB | 2402205 | A | 12/2004 |
| JP | 62197335 | A | 9/1987 |
| JP | 3153212 | A | 7/1991 |
| JP | 8194437 | A | 7/1996 |
| JP | H08271883 | A | 10/1996 |
| JP | 11160727 | A | 6/1999 |
| JP | 2002158475 | A | 5/2002 |
| JP | 2004205599 | A | 7/2004 |
| JP | 2005029579 | A | 2/2005 |
| JP | 2005055641 | A | 3/2005 |
| JP | 2005121940 | A | 5/2005 |
| JP | 2005134849 | A | 5/2005 |
| JP | 2005225793 | A | 8/2005 |
| JP | 2008292743 | A | 12/2008 |
| KR | 20040097466 | A | 11/2004 |
| KR | 1020060016469 | A | 2/2006 |
| KR | 100666961 | B1 | 1/2007 |
| KR | 1020070070675 | A | 7/2007 |
| KR | 20080046335 | A | 5/2008 |
| KR | 20080086245 | A | 9/2008 |
| MY | PI20071284 | | 2/2009 |
| TW | 201114716 | A | 5/2011 |
| WO | WO2004036270 | A1 | 4/2004 |
| WO | WO2005079129 | A1 | 8/2005 |
| WO | WO2011049564 | A1 | 4/2011 |
| WO | WO2012073929 | A1 | 6/2012 |
| WO | WO2014149502 | A1 | 9/2014 |

OTHER PUBLICATIONS

Cytec, Uvekol S UV Curable Glass Laminating System, May 4, 2006, 1 Page.

Schott, Glass Made of Ideas: Opalika, 2 Pages.

Pilkington Building Products, Pilkington OptiView Anti-Reflective Glass, 2005, 2 Pages.

T.M. Zeef, T.H. Hubing, J.L. Drewniak, R.E. Dussroff & T.P. Van Doren, Emc Analysis of an 18" LCD Monitor, Aug. 21-25, 2000, 1 Page.

3M Optical Systems, Immerse Yourself in Color, 2013, 4 Pages.

Wikipedia, Sol-gel, 2016, 12 Pages.

Panel-Brite, Inc., AOT (Advanced Optibond Technology), Mar. 11, 2009, 1 Page.

Dow Corning Corporation, Information About High Technology Silicone Materials, 1992, 4 Pages.

Dow Corning Corporation, Material Safety Data Sheet, Mar. 29, 2011, 8 Pages.

Pilkington Building & Speciality Glass Products, Pilkington TEC Glass for the Refrigeration Market, 2002, 2 Pages.

Mentley, David E., State of Flat-Panel Display Technology and Future Trends, Proceedings of the IEEE, Apr. 2002, vol. 90, No. 4, pp. 453-459.

* cited by examiner

OPTICAL STACK WITH ADDITIONAL EDGE SEAL, ELECTRONIC DISPLAY INCORPORATING THE SAME, AND METHODS FOR PROVIDING THE SAME

CROSS-REFERENCE TO RELATED APPLICATIONS

This application claims the benefit of U.S. Provisional Application Ser. No. 63/622,692 filed Jan. 19, 2024, the disclosures of which are hereby incorporated by reference as if fully restated herein.

TECHNICAL FIELD

Exemplary embodiments relate generally to optical stacks with an additional edge seal, as well as electronic displays incorporating the same, and methods for providing the same.

BACKGROUND AND SUMMARY OF THE INVENTION

Various types of electronic displays are known. Examples of such electronic displays include liquid crystal displays (LCDs) though other types of electronic displays are known, such as but not limited to organic light emitting diode (OLED) type displays. It is known to employ optical stacks to form, as part of, and/or with, such electronic displays. These optical stacks may include the electronic display layer(s), polarizers, cover layers, quarter wave retarders, anti-reflection films, light diffusion layer with light diffusion elements (e.g., diffuser), touch sensitive layers, substrates (e.g., glass, polymer, etc.), combinations thereof, or the like. Regardless, a stack of certain optical layers is assembled, and an adhesive is applied between the layers of the stack to secure the stack. However, such display stacks may experience relatively extreme conditions, such as but not limited to relatively high temperatures and/or pressures, which may cause the stack to delaminate, especially where stresses are repeatedly experienced over time. This is particularly true in the digital out of home (DOOH) advertising market where such electronic displays are often provided as part of assemblies and deployed in outdoor environments. Because of this application, such units typically experience relatively extreme operating conditions and/or are often operated with greater frequency and over longer periods of time than, for example, indoor, residential type electronic displays. For example, such DOOH units are typically exposed to cyclic (i.e., daily and/or seasonal) temperature and solar loading fluctuations.

Furthermore, optical stacks, such as LCD layers, are known to naturally be pulled towards a heat source. In the case of DOOH units, for example, this may tend to cause optical stacks to move towards a cover panel which is heated by the sun. Particularly if contact is made, this may result in damage to the optical stack, such as boiling of the liquid crystals in an LCD layer, resulting in "dead spots" in the display where no image is generated.

Certain optical components and/or electronic displays for such units may, for various reasons, be sourced from providers which do not necessarily have the DOOH outdoor market in mind when developing products. Such optical components and/or electronic displays may fail under repeated stresses. Thus, what is needed is a more ruggedized electronic display optical stack.

Electronic display optical stacks with enhanced ruggedization are provided, along with components, systems, and methods for providing the same. In exemplary embodiments, without limitation, such enhanced ruggedization is provided by creating an improved and/or additional edge seal about some or all edges of the optical stack. This may take the form of an additional layer of adhesive, which may be a secondary, tertiary, or so forth, layer and/or seal. Alternatively, or additionally, these disclosures may be utilized to provide an initial and/or sole layer of edge seal adhesive for the optical stack.

In exemplary embodiments, without limitation, the electronic display optical stack is secured in place, such as at a table or other work surface. A, preferably additional, layer of adhesive is deposited about the edges of the optical stack, such as by way of one or more robotic devices. A shaping tool is provided which travels the edges to smooth the adhesive, such as by the same or a different robot. The shaping tool may include a vertical component and two horizontally projecting components, such as to form a C-shape. In this fashion, the shaping tool may extend over the edge and partially over top and bottom surfaces of the optical stack. The adhesive may optionally be deposited through the shaping tool, though such is not required. The shaping tool may optionally include one or more components for curing, or assisting with curing, the adhesive, such as one or more ultra-violet light sources, fans, air nozzles, heat sources, combinations thereof, or the like. In other exemplary embodiments, such components may be provided separately, such as at a separate curing tool, preferably controlled by a same or different robot. The resulting optical stack may have greater strength for resisting delamination and other wear and tear.

In exemplary embodiments, curing is performed while adhesive is still being deposited for a particular unit. For example, as adhesive is deposited it may be subsequently cured. This may help to reduce or prevent shrinkage and/or stresses on the optical stack during curing. The additional layers may be separate from, and/or at least partially commingled with, the existing layer(s), such as by wicking between the layers of the optical stack into, and/or next to, the existing layer(s).

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
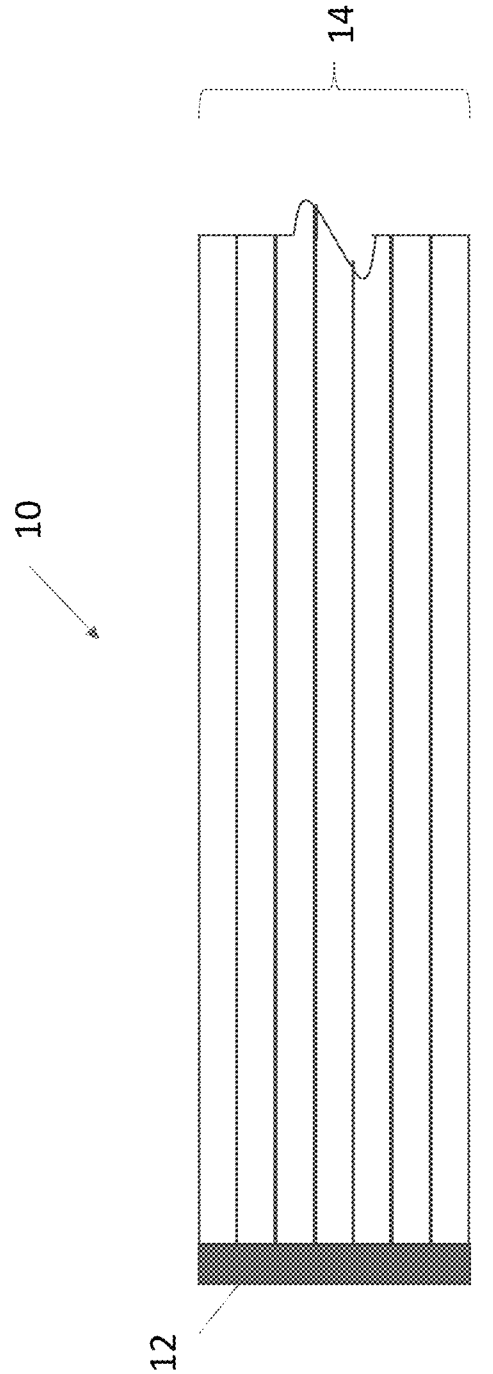
FIG. 1 is a side view of an exemplary electronic display optical stack with an exemplary edge seal.

FIG. 1 illustrates an exemplary optical stack 10 with an edge seal 12. The edge seal 12 may be a primary and/or sole edge seal/layer, or more preferably, may be a secondary, tertiary, or the like seal/layer. The edge seal 12 may comprise one or more layers of adhesive, a mechanical seal, combinations thereof, or the like. The edge seal 12 may serve to keep the various layers 14 of the optical stack 10 together. The edge seal 12 may be provided at one or more sides of the optical stack 10. The edge seal 12 may be provided in addition to an existing edge seal/layer and/or as part of a sole and/or integrated, but multi-layered, seal.

The layers 14 may comprise one or more: electronic display layer(s), polarizers, cover layers, quarter wave retarders, anti-reflection films, light diffusion elements, touch sensitive layers, substrates (e.g., glass, polymer, etc.), combinations thereof, or the like. A wide variety of number, type, arrangement, and the like of the layers 14 may be utilized. Certain layers 14 may be spaced apart from one another. The illustrated number, arrangement, size, and the like of the layers 14 is merely exemplary and not intended to be limited.

Figure 1B:
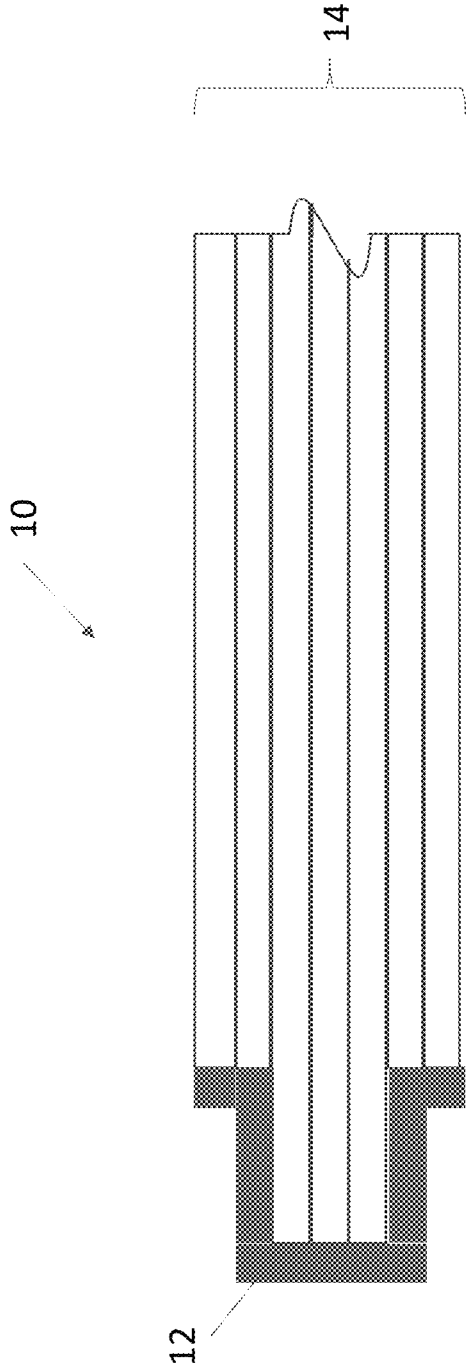
FIG. 1B is a side view of another exemplary electronic display optical stack with another exemplary edge seal.

Not all layers 14 of the optical stack 10 need necessarily be of the same size and/or shape (e.g., surface area, thickness, combinations thereof, or the like). For example, without limitation, FIG. 1B illustrates another exemplary embodiment of the optical stack 10 and edge seal 12.

Figure 1C:
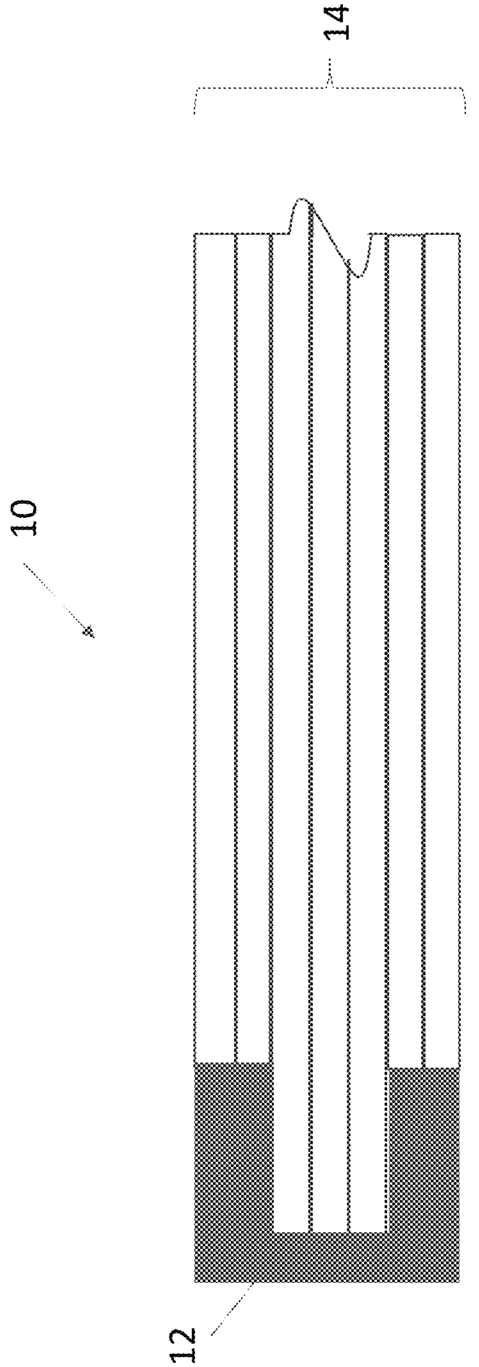
FIG. 1C is a side view of another exemplary electronic display optical stack with another exemplary edge seal.

Any size and/or shape edge seal 12 may be created. For example, without limitation, FIG. 1C illustrates another exemplary form of the edge seal 12.

The edge seals 12 shown and/or described herein may be an initial and/or sole edge seal and/or may comprise one or more additional layers of adhesive 22 and/or edge seals (e.g., secondary layer/seal). The edge seals 12 shown and/or described herein may be those created using the systems, components, and/or methods shown and/or described herein.

Figure 2:
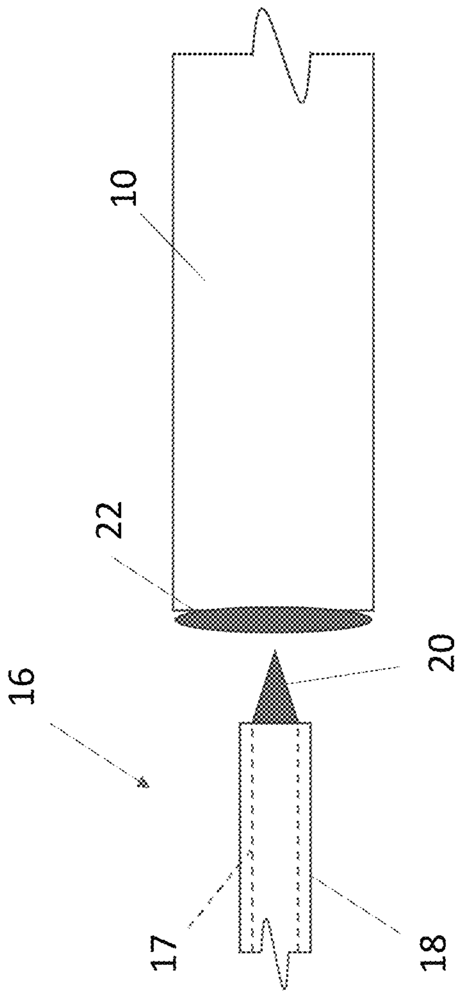
FIG. 2 is a side view of an exemplary adhesive deposit tool.

FIG. 2 illustrates an exemplary adhesive depositing tool 16. The adhesive depositing tool 16 may be connected to, configured for connection to, and/or form part of, one or more robotically controlled devices, such as one or more industrial robots. The adhesive depositing tool 16 may be provided in advance of a shaping tool 18 or may be part of the shaping tool 18. In such embodiments, the shaping tool 18 and the adhesive depositing tool 16 may form a singular tool. The adhesive depositing tool 16 may comprise a fluid passageway 17, such as for one or more adhesives. The fluid passageway 17 may be connected to, or configured for connection to, one or more lines, pumps, motors, plungers, reservoirs, combinations thereof, or the like for storing, transporting, and/or causing adhesive to be moved through the adhesive depositing tool 16 to the optical stack 10.

A deposit component 20, such as a nozzle, atomizer, or other feature, may optionally be located at a distal end of the fluid passageway 17 for depositing the adhesive 22 at the edge of the optical stack 10 for forming the edge seal 12. The adhesive 22 may be deposited from a distal end of the fluid passageway 17 and/or the deposit component 20 may form part of the distal end of the fluid passageway 17, for example.

Figure 3:
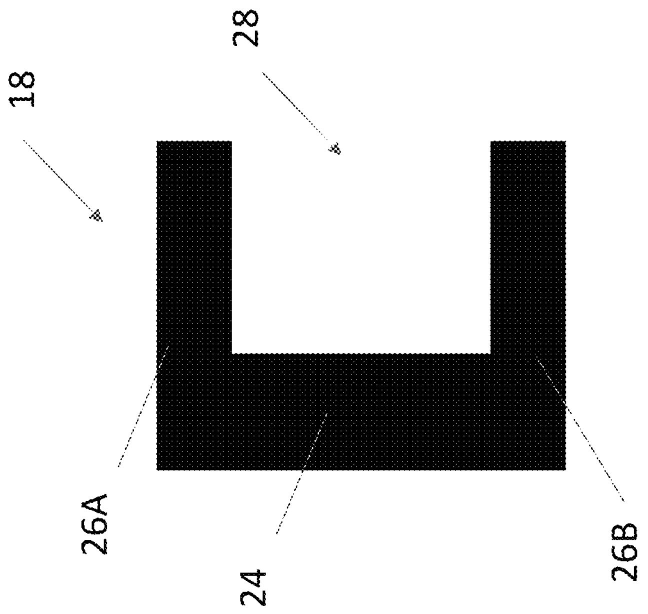
FIG. 3 is a side view of an exemplary shaping tool.

FIG. 3 illustrates an exemplary shaping tool 18. The shaping tool 18 may be connected to, configured for connection to, and/or form part of, a same or different one or more robotically controlled devices, such as one or more industrial robots, as the deposit tool 16. The shaping tool 18 may be used after the adhesive 22 is deposited to shape and/or cure it.

In exemplary embodiments, without limitation, the shaping tool 18 may comprise a first, preferably substantially (e.g., within 20%) vertical, component 24 and two or more, preferably substantially (e.g., within 20%) horizontal, additional components 26A, 26B extending therefrom, such as from an upper and lower portion of the first component 24, respectively. The shaping tool 18 may form a substantially C-shaped block. However, other shapes may be used. Preferably, the shaping tool 18 is shaped to cover an edge of the optical stack 10 and at least part of the upper and lower surfaces thereof.

Regardless, the shaping tool 18 may comprise and/or form an interior cavity 28 which is configured to accommodate an edge portion of the optical stack 10. The cavity 28 may be open on left or right ends thereof (when viewed from above) such that the shaping tool 18 may slide along the edge(s) of the optical stack 10, such as to shape and/or cure the deposited adhesive 22, such as illustrated with particular regard to FIG. 4 and FIG. 4B.

Figure 4:
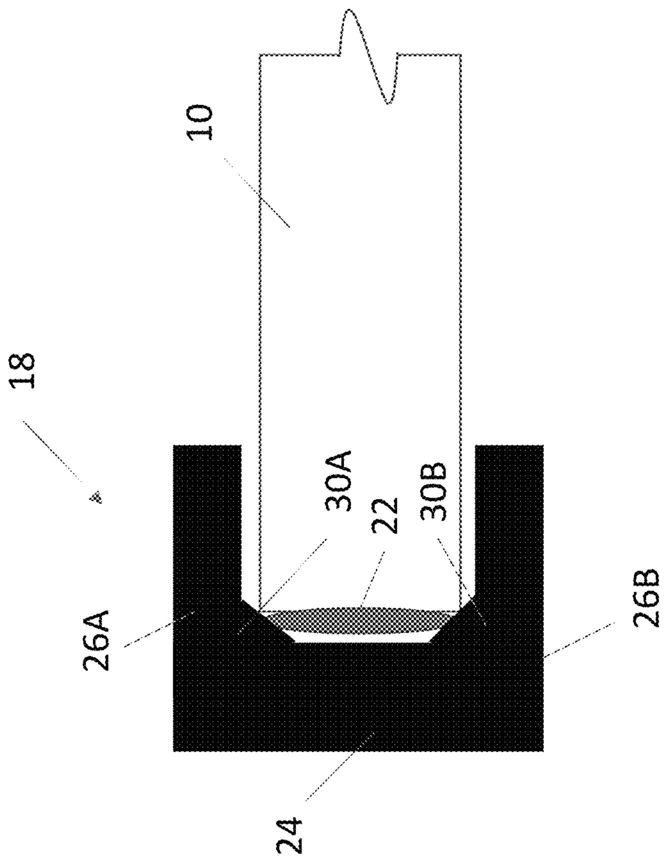
FIG. 4 is a side, sectional view of an exemplary embodiment of the shaping tool of FIG. 3.
Figure 4B:
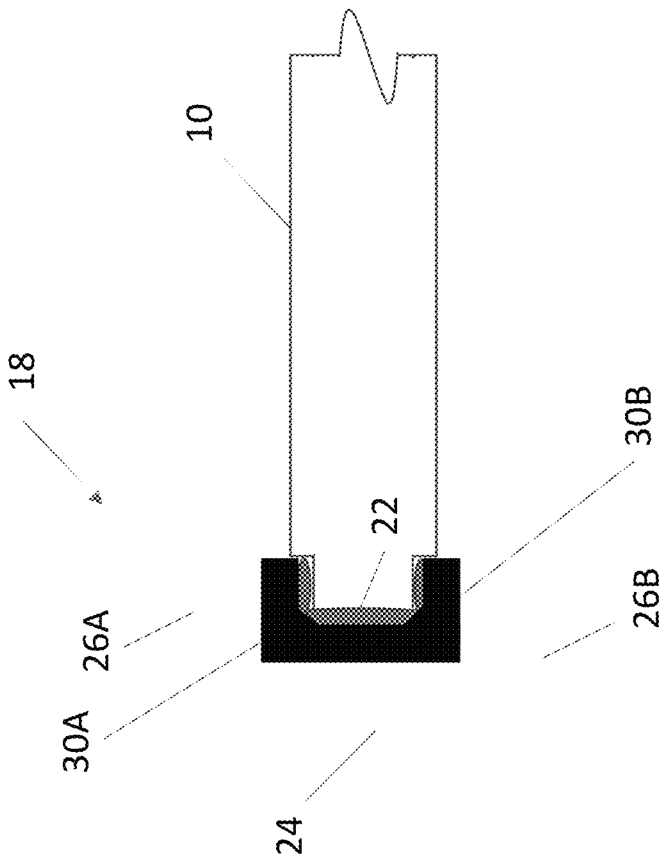
FIG. 4B is a side, sectional view of the shaping tool of FIG. 4 at another exemplary optical stack.

As also shown with particular regard to FIGS. 4-4B, the shaping tool 18 may comprise shaping features 30A, 30B within the cavity 28, such as for shaping the deposited adhesive 22. The shaping features 30 may comprise angular surfaces, curved surfaces, protrusions, recesses, combinations thereof, or the like. The shaping features 30A, 30B may be provided at upper and lower corners, respectively between the first component 24 and the additional components 26A, 26B, respectively, though such is not necessarily required. The shaping features 30 may aid in shaping the deposited adhesive 22 into a desirable shape of the edge seal 12.

The shaping tool 18 may comprise, and/or be formed from, one or more blocks of one or more polymers, metals, combinations thereof, or the like. In this sense, the first component 24, the additional components 26, and/or any shaping features 30 of the shaping tool 18 may be integrally formed, though such is not necessarily required.

Figure 5:
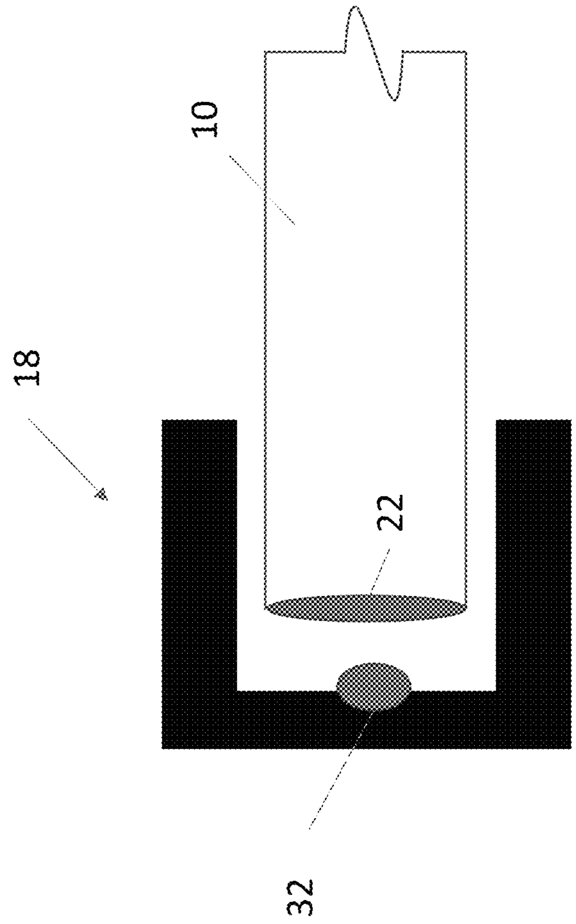
FIG. 5 is a side, sectional view of an exemplary embodiment of the shaping tool of FIG. 3.

As illustrated with particular regard to FIG. 5, the shaping tool 18 may comprise one or more curing components 32. Alternatively, the curing components 32 may be provided at a separate tool (e.g., curing tool) which is connected to, configured for connection to, and/or form part of, a same or different one or more robotically controlled devices, such as one or more industrial robots, as the deposit tool 16 and/or the shaping tool 18.

The curing components 32 may be configured to cure, or aid with curing, the adhesive 22 when activated. The curing component(s) 32 may comprise one or more lights, chemical dispensers, and/or heat sources for example, without limitation. The curing component(s) 32 may be configured to emit ultraviolet light, visible light, heat, chemicals, air, gases, combinations thereof, or the like when activated. For example, without limitation, the curing component(s) 32 may comprise lighting elements, fans, nozzles, aerosolizers, heating elements, combinations thereof, or the like. The curing component(s) 32 may be electrically connected to power supplies (e.g., for supplying electrical power to supply light and/or heat), fluid passageways, motors, pumps, and/or reservoirs (e.g., for depositing chemicals and/or gases), combinations thereof, or the like. For example, without limitation, the curing component(s) 32 may cure the adhesive 22 by way of light, heat, air, and/or chemical (e.g., part of a two-part epoxy, catalyst, activating agent, combinations thereof, or the like) exposure. Preferably, the curing component 32 is substantially (e.g., within 20%) centrally located at the first component 24.

Figure 6:
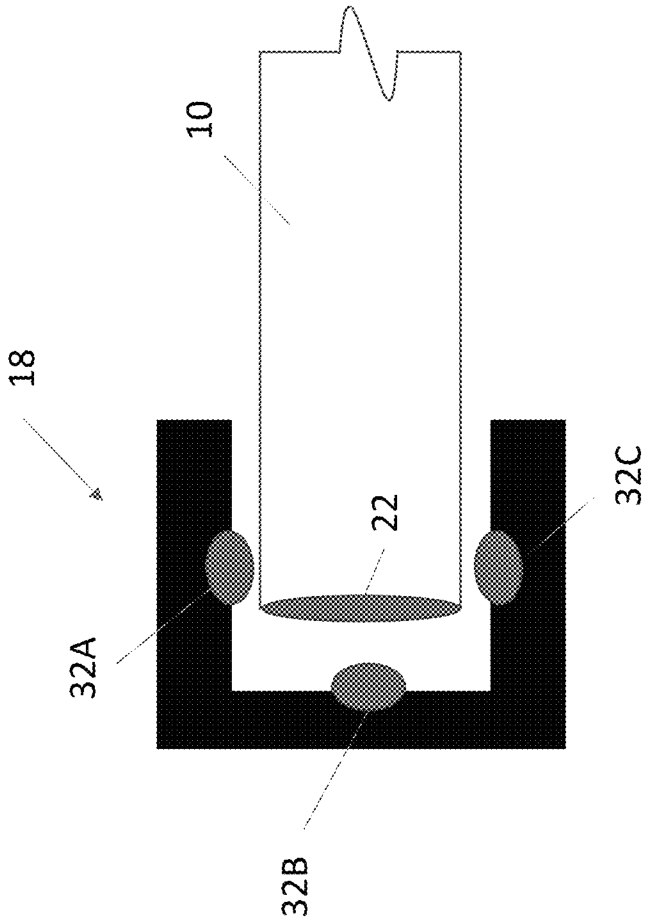
FIG. 6 is a side, sectional view of an exemplary embodiment of the shaping tool of FIG. 3.
Figure 6B:
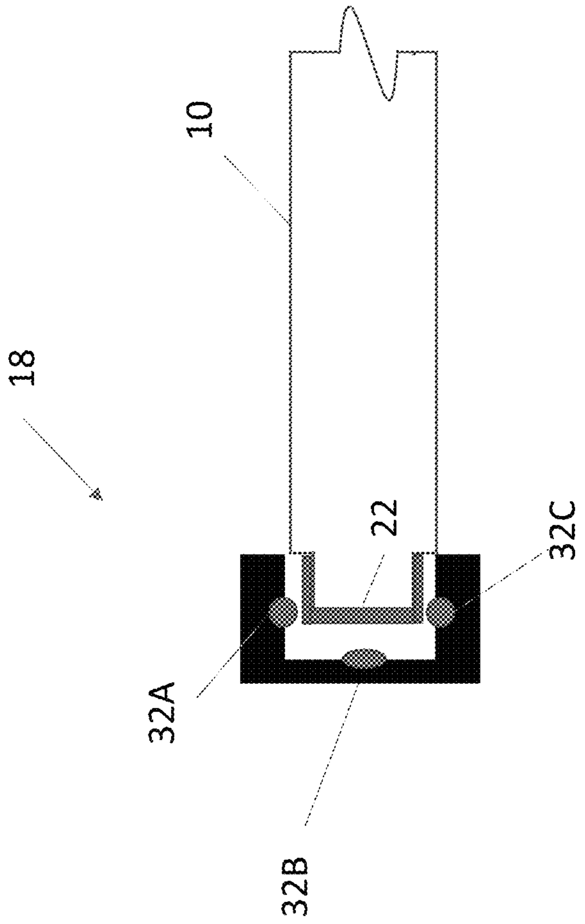
FIG. 6B is a side, sectional view of the shaping tool of FIG. 3 at another exemplary optical stack.

In other exemplary embodiments, such as illustrated in FIG. 6 and FIG. 6B, multiple curing components 32A, 32B, 32C, may be spaced apart at the shaping tool 18, such as laterally along the first component 24, vertically along the first component 24, laterally along the additional components 26, and/or horizontally along the additional components 26, such as to improve exposure and aid in curing. Any number, arrangement, type, and the like of curing components 32 may be utilized.

The size and/or shape of the tools, such as the depositing tool 16, shaping tool 18 and/or components thereof may be adapted to work with various size and/or shape optical stacks 10 and/or to provide various size and/or shaped adhesive 22 and/or edge seals. For example, without limitation, these disclosures useful for creating an additional edge seal about optical stacks 10 with multiple, substantially (e.g., within 20%) coextensive layers and/or where not all layers 14 are necessarily coextensive, such as by allowing the adhesive 22 and/or resulting edge seal 12 to extend about the shape of the edge. As those of skill in the art will recognize, these disclosures may provide improvements for a wide variety of types and kinds of optical stacks 10.

Figure 7:
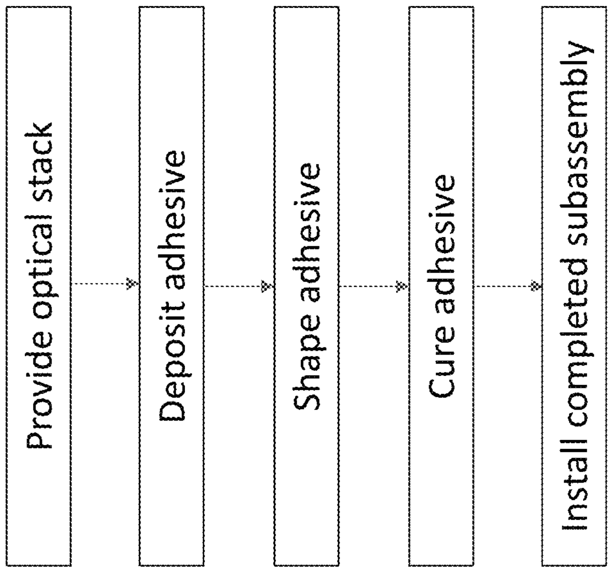
FIG. 7 is a flow chart with an exemplary method for providing an electronic display optical stack with an additional edge seal.

FIG. 7 illustrates an exemplary method for creating the edge seal 12 and resulting subassembly. The optical stack 10 may be provided. Preferably, the optical stack 10 is provided at a table or other surface. The optical stack 10 may be secured to the table or other surface, such as by way of a vacuum system, clamps, combinations thereof, or the like. However, in other exemplary embodiments, the optical stack 10 may rest freely on the table or other surface. The optical stack 10 may already have one or more existing edge seals 12, or no edge seal.

The adhesive 22 may be deposited. Preferably, the adhesive 22 is deposited along all or substantially (e.g., at least 80% of) all of at least some, if not all, edges of the optical stack 10, though such is not necessarily required. Only some edges, and/or only some portions of some edges of the optical stack 10 need receive the adhesive 22. Preferably, the adhesive 22 is deposited along all or substantially (e.g., at least 80% of) all of three sides of the optical stack 10. In this fashion, the remaining, fourth side may be less or entirely unsealed to permit thermal expansion.

The adhesive 22 may be applied in any fashion (e.g., continuously, intermittently, and/or in any pattern). As previously mentioned, the optical stack 10 may already have one or more existing edge seals 12 to which the adhesive 22 is deposited atop of. Alternatively, the optical stack 10 may have no existing edge seal prior to deposit of the adhesive 22 such that an edge seal is thereby formed.

Preferably, the adhesive 22 is deposited by way of the depositing tool 16. In exemplary embodiments, the depositing tool 16 is connected to, or part of, a robotically controlled machine, such as but not necessarily limited to, a gantry table robot system, articulated robot, combinations thereof, or any type or kind of industrial robot.

The adhesive 22 may be shaped after deposit, such as by way of the shaping tool 18. The shaping tool 18 may be connected to, or part of, a same or different robotically controlled machine as the depositing tool 16. As previously mentioned, the depositing tool 16 may optionally be part of the shaping tool 18. In this fashion, depositing may be followed by shaping in a common tool or multiple tools.

The adhesive 22 may be cured after deposit and/or shaping, such as naturally (e.g., time and/or ambient environment exposure) and/or by way of the curing component (s) 32 of the shaping tool 18 or by way of an additional tool that follows separately. In this fashion, depositing may be followed by shaping and/or curing in a common tool or multiple tools.

The completed subassembly may be removed from the table or other surface, such as for subsequent installation at an electronic display, electronic display subassembly, electronic display assembly, combinations thereof, or the like.

As previously discussed, this method may be used to create an initial edge seal 12 for the optical stack 10 and/or an additional edge seal 12 for the optical stack 10.

The edge seal 12 formed using the systems, tools, and/or techniques shown and/or described herein may be superior to other edge seals, such as in terms of resisting delamination or other separation and/or other types and/or kinds of failure. These systems, tools, and/or techniques shown and/or described herein may alternatively or additionally be used to provide additional edge seals 12 (i.e., separate seals or additional layers to existing seals) to enhance existing edge seals, thereby improving performance, such as in resisting delamination or other separation and/or other types and/or kinds of failure.

In exemplary embodiments, curing the adhesive as it is deposited, such as before all adhesive is deposited for a particular unit and/or otherwise on a section-by-section basis, may prevent or reduce cure shrinking. This may be particularly helpful for preventing or reducing the newly deposited adhesive from pulling away from the area it is deposited in and/or reduce stress experienced at the layers of the optical stack. For example, without limitation, deposited portions of the adhesive may be cured as other portions are still being deposited. As another example, without limitation, some or all adhesive may be deposited and curing may be undertaken section-by-section, such as by moving the curing component 32 about the optical stack 10. This approach of curing while underway may be facilitated by use of the systems and/or methods shown and/or described herein, though other approaches and/or components may be utilized.

The additional adhesive layer(s) and/or seal(s) 12 shown and/or described herein may be spaced apart from the existing and/or other layer(s) and/or seal(s), may be placed immediately adjacent thereto, and/or may be at least partially commingled therewith. For example, without limitation, the additional adhesive layer(s) and/or seal(s) 12 may be at least partially wicked between the layers 14 of the optical stack 10, such as to be provided adjacent the existing and/or other layer(s) and/or seal(s). In this fashion, the additional adhesive layer(s) and/or seal(s) 12 may be placed adjacent to the existing adhesive layer(s) and/or seal(s) (e.g., directly abutting and/or spaced apart from). As another example, without limitation, the additional adhesive layer(s) and/or seal(s) 12 may be placed atop the existing and/or other layer(s) and/or seal(s).

Preferably, at least the additional adhesive layer(s) and/or seal(s) 12, but optionally also the existing and/or other adhesive(s), layer(s), and/or seal(s) comprise or consist of an adhesive with a relatively high elongation, relatively low cure shrinkage, and/or a relatively lower modulus of elasticity (e.g., on the order of 100,000 to 300,000 psi, without limitation).

FIG. 8 through FIG. 11 illustrate other exemplary, simplified embodiments of the seal(s) 12 in accordance with these disclosures. These embodiments may be generated using some or all of the systems, components, methods and/or steps shown and/or described herein. While a simplified, two-layer optical stack that shares a common edge is shown, those of skill in the art will recognize that these embodiments may be used with various number, size, and/or arrangement of layers 14 of various size, shape, and/or composition optical stacks 10.

The primary seal 12A may optionally be generated by other systems, components, methods and/or steps than those shown and/or described herein. For example, without limitation, the primary seal 12A may be provided as an LCD main seal in a commercially available product, by way of non-limiting example. Further still, while the terms primary and additional are sometimes used, that is not intended to necessarily infer that either seal is necessarily stronger and/or acts before the other.

Figure 8:
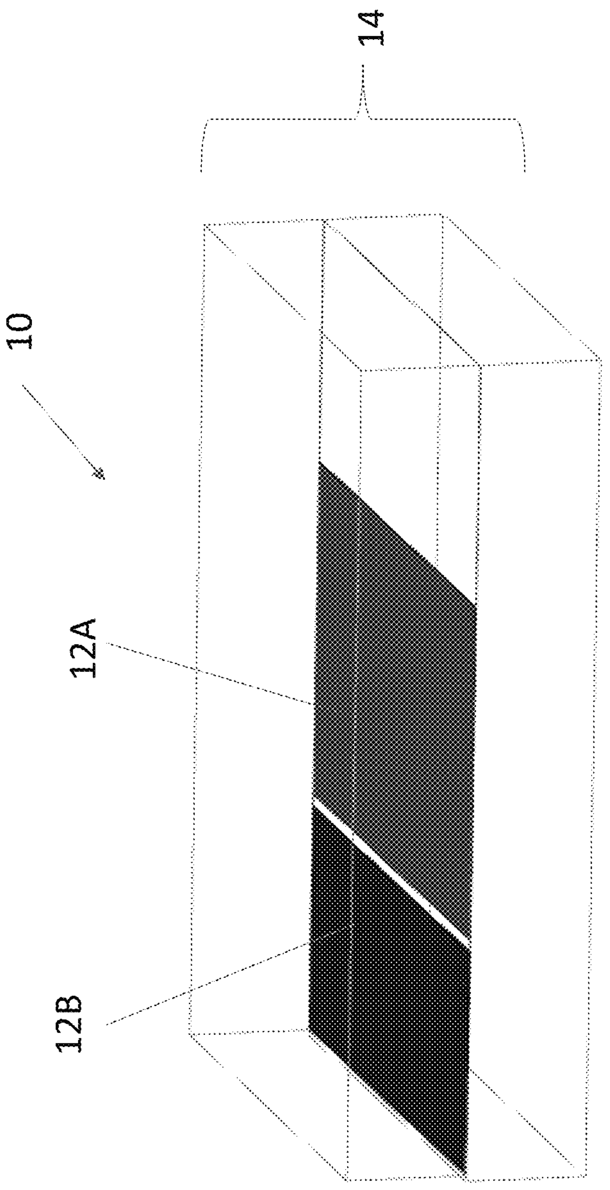
FIG. 8 is a perspective, partially transparent, detailed view of an exemplary optical stack with exemplary additional edge seal.

Referring more specifically to FIG. 8, the additional seal 12B may be wicked in between layers 14 of the optical stack 10 to abut, or be positioned adjacent to (but optionally at least partially, if not fully, spaced apart from) the primary seal 12A.

Figure 9:
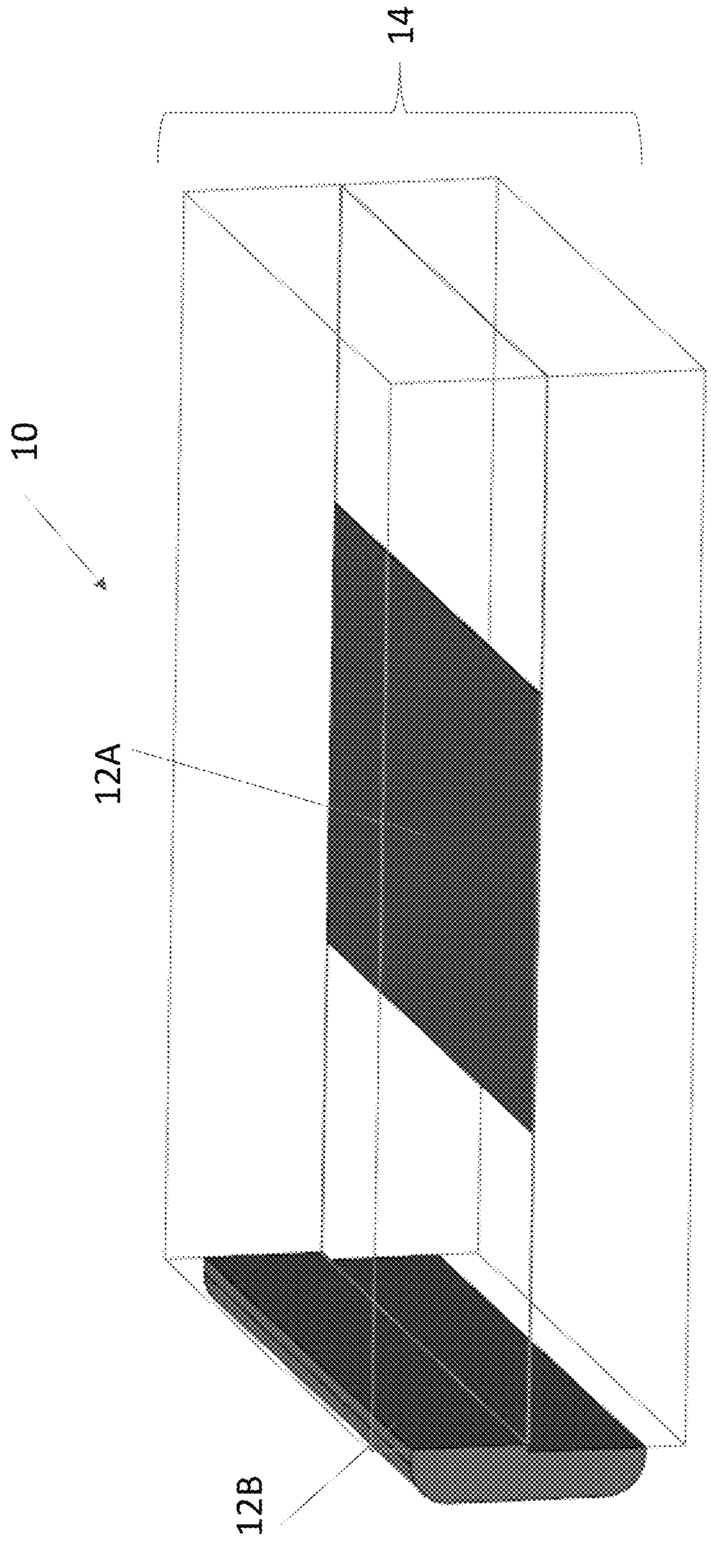
FIG. 9 is a perspective, partially transparent, detailed view of an exemplary optical stack with another exemplary additional seal.

Referring more specifically to FIG. 9, the additional seal 12B may be positioned along one or more outer edges of the layers 14 of the optical stack 10. This additional seal 12B may be spaced apart from the primary seal 12A.

Figure 10:
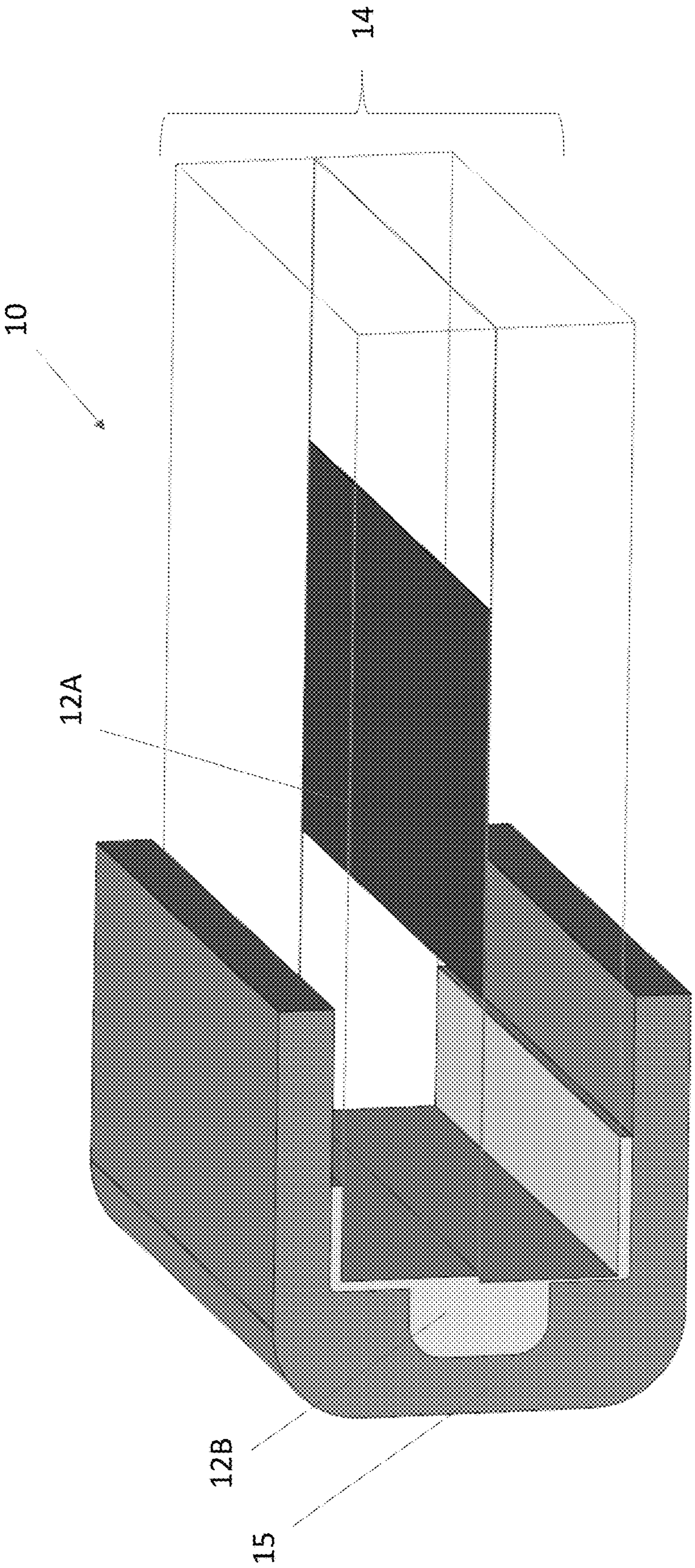
FIG. 10 is a perspective, partially transparent, detailed view of an exemplary optical stack with another exemplary additional seal.
Figure 11:
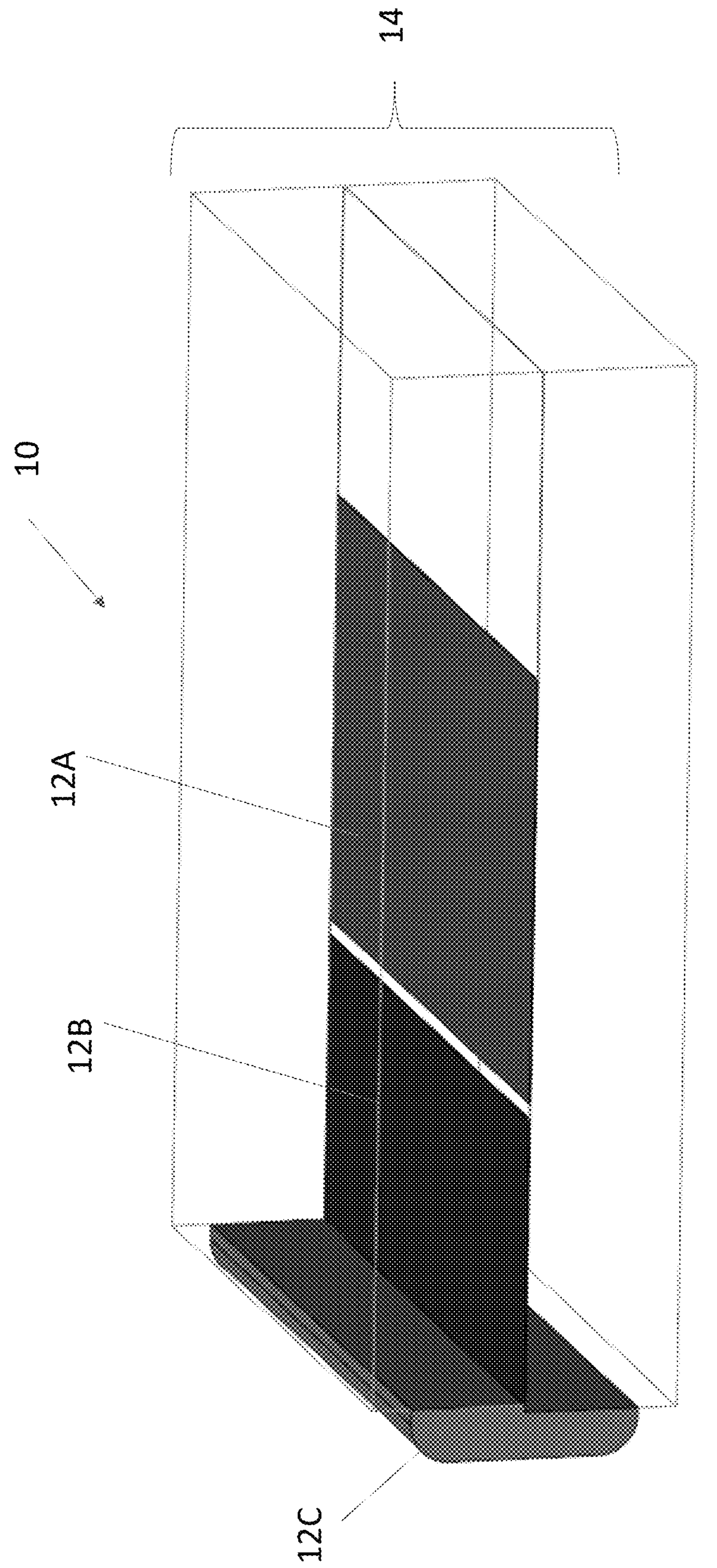
FIG. 11 is a perspective, partially transparent, detailed view of an exemplary optical stack with another exemplary additional seal.

Referring more specifically to FIG. 10, the additional seal 12B may be positioned along one or more outer edges of the layers 14 of the optical stack 10. This additional seal 12B may be spaced apart from the primary seal 12A. An edge protection part 15 may be positioned along the additional seal 12B and may be adhered thereto. The edge protection part 15 may shape the adhesive of the additional seal 12B and/or be adhered to the optical stack 10 by the same. The edge protection part 15 may cover the edge(s) of the layers 14 of the optical stack 10 and may optionally extend over at least a portion of the upper and/or lower surfaces of the optical stack 10. In this fashion, the edge protection part 15 may form a general "C" shape. Various size and/or shape edge protection part 15 may be utilized. The edge protection part 15 may be provided at some or all edges, and/or along some or all of a length of each edge. The edge protection part 15 may optionally serve as another seal.

While a primary seal 12A and secondary seal 12B are sometimes shown and/or described, various number of layers or type of seals 12 may be used. Furthermore, these embodiments may be combined in various ways. By way of non-limiting example, and referring more specifically to FIG. 11, the embodiment of FIGS. 8-9 may be essentially combined into a triple seal. A first additional seal 12B may be wicked in between layers 14 of the optical stack 10 to abut, or be positioned adjacent to (but optionally at least partially, if not fully, spaced apart from) the primary seal 12A. A second additional seal 12C may be positioned along one or more outer edges of the layers 14 of the optical stack 10. This additional seal 12B may be spaced apart from the primary seal 12A.

A third additional seal 12C may optionally be provided by the edge protection part 15 of FIG. 10, by way of non-limiting example, thereby forming a quadruple seal. Those of skill in the art will recognize the various combinations of these additional seals 12A-12C may be combined and/or replicated to make a wide variety of number of seals of different types for different optical stacks 10, for example.

The optical stack 10 may be provided as part of a display assembly, which may include a housing, a backlight, supporting electronics (e.g., timing and control board, power modules, processors, electronic storage devices, video players, combinations thereof, or the like), peripheral equipment (e.g., cameras, sensors, emergency contact equipment, combinations thereof, or the like), thermal management components (e.g., airflow pathways, fans, heat exchangers, combinations thereof, or the like), covers, structural frameworks, combinations thereof, or the like, particularly, but not necessarily, as part of a DOOH advertising display unit.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by one or more wired or wireless connectivity components (e.g., routers, modems, ethernet cables, fiber optic cable, telephone cables, signal repeaters, and the like) and/or networks (e.g., internets, intranets, cellular networks, the world wide web, local area networks, and the like). The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A method for providing an optical stack with an additional edge seal, said method comprising:

providing an optical stack comprising a plurality of layers joined by a primary edge seal; and providing an additional edge seal for the plurality of layers, wherein the additional edge seal is spaced apart from the primary edge seal, wherein providing the additional edge seal comprises:

providing the deposit of adhesive at the edge of each of the plurality of layers; and passing a tool having at least three sides along the edge of each of the plurality of layers to smooth the deposited adhesive such that a first side of the at least three sides of the tool extends over part of a top surface of the plurality of layers, a second side of the at least three sides of the tool extends over a lateral side edge of the plurality of layers, and a third side of the at least three sides of the tool extends over part of a bottom surface of the plurality of layers.

2. The method of claim 1 wherein:

the primary edge seal comprises a first deposit of adhesive between the plurality of layers; and the additional edge seal comprises a second deposit of adhesive provided at an edge of each of the plurality of layers.

3. The method of claim 1 wherein:

the primary and additional edge seals are each provided between the plurality of layers.

4. The method of claim 3 further comprising:

providing a tertiary edge seal comprising a deposit of adhesive provided at an edge of each of the plurality of layers.

5. The method of claim 1 wherein:

the tool comprises at least one curing component such that the deposit of adhesive is cured as it is smoothed; and passing the tool having at least three sides along the edge of each of the plurality of layers to smooth the deposited adhesive includes activating the at least one curing component while passing the tool along the edge of each of the plurality of layers to at least partially cure the adhesive.

6. The method of claim 5 wherein:

the at least one curing component comprises an ultraviolet light source.

7. The method of claim 1 wherein:

the tool comprises at least one air nozzle; and passing the tool having at least three sides along the edge of each of the plurality of layers to smooth the deposited adhesive includes passing air through the at least one air nozzle while passing the tool along the edge of each of the plurality of layers.

8. The method of claim 1 wherein:

the tool comprises an ultraviolet ("UV") light source and an air nozzle such that the deposit of adhesive is cured as it is smoothed; and passing the tool having at least three sides along the edge of each of the plurality of layers to smooth the deposited adhesive includes activating the UV light source and passing air through the air nozzle while passing the tool along the edge of each of the plurality of layers to at least partially cure the adhesive.

9. The method of claim 1 wherein:

the tool is robotically controlled.

* * * * *